June 4, 1940.    G. SMITH    2,203,620
APPARATUS FOR TREATING THERMOPLASTIC PRODUCTS
Filed Feb. 19, 1938    2 Sheets-Sheet 1

Inventor
Graydon Smith
by Kenway & Witter
Attorneys

June 4, 1940.　　　　　　　G. SMITH　　　　　　　2,203,620
APPARATUS FOR TREATING THERMOPLASTIC PRODUCTS
Filed Feb. 19, 1938　　　　2 Sheets-Sheet 2
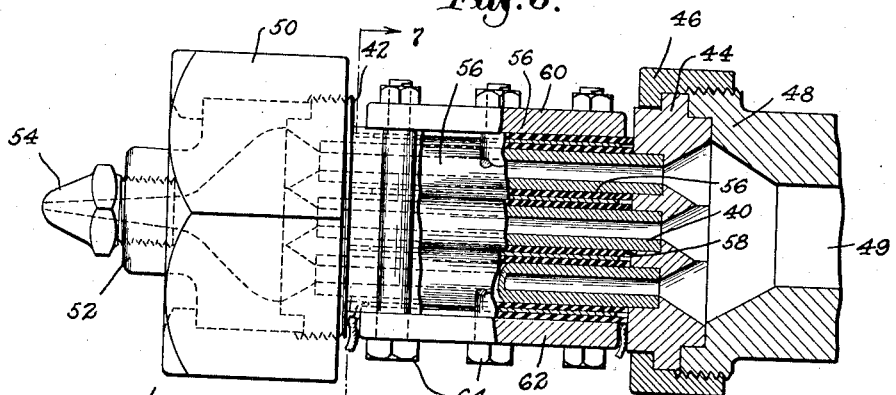
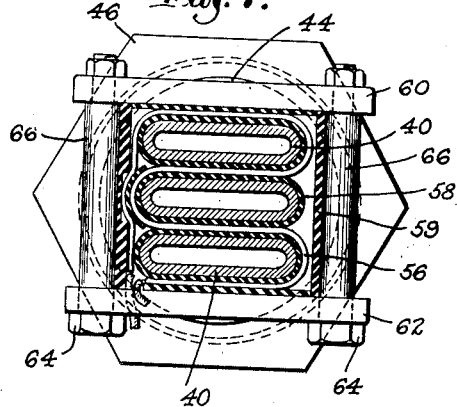
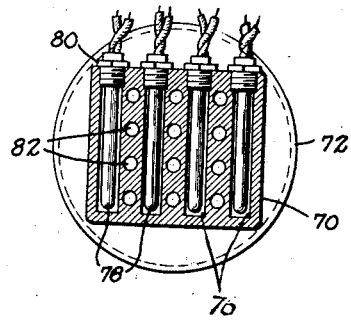
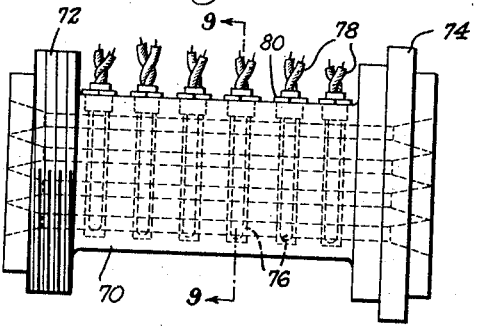
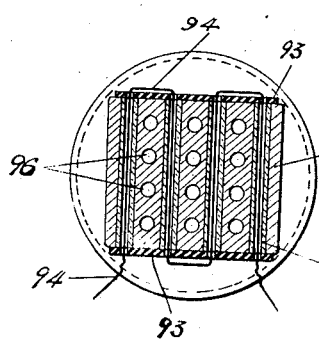
Inventor
Graydon Smith
by Kenway & Witter
Attorneys Patented June 4, 1940

2,203,620

UNITED STATES PATENT OFFICE 2,203,620

APPARATUS FOR TREATING THERMOPLASTIC PRODUCTS

Graydon Smith, Cambridge, Mass., assignor to Reed Prentice Corporation, Worcester, Mass., a corporation of Massachusetts Application February 19, 1938, Serial No. 191,487

4 Claims. (Cl. 219—39)

This invention consists in an improved apparatus for heating thermoplastic or thermosetting materials used in the manufacture of molded articles. Many of the substances used in the art of injection molding require subjection to heat in order that they may be rendered workable. Such substances include formaldehyde and other resins, phenol condensates, Bakelite, and cellulose derivatives and are usually delivered to manufacturers in granular or powdered form.

An apparatus now in use for injection molding includes a hopper, a plunger or ram for forcing the material through the apparatus, a heated cylindrical conduit, and a nozzle. The nozzle is inserted in the orifice of a mold; moldable material is forced by the plunger through the heated conduit where it is rendered workable and ejected through the nozzle into a mold. This invention relates to the conduit in a molding apparatus and comprises a novel structure by the use of which more efficient heating of a mass of moldable material may be obtained than has been heretofore realized. In general practice the conduit is provided with a centrally disposed core, or "pineapple" around which the material advancing through the conduit spreads and forms an annular layer, thus increasing its surface area and facilitating uniform heating of the mass. The outer wall of the conduit has been heated in various ways, but none has proved satisfactory from the standpoint of time and thoroughness, since the distribution of the heat has been erratic.

An important object of my invention is to provide means for producing uniform and rapid heating of the conduit body thereby correspondingly heating the material being advanced through a passage or passages therein, and by distributing the heat evenly, preventing the danger of overheating and burning the moldable material.

Another object of my invention is to provide a conduit heated by electrical means easily controllable and operable without requiring the skill and judgment of expert operators.

A further object of my invention is to provide a conduit which is compact and capable of being attached to an existing machine of the type now in general use without expensive alterations.

An important feature of my invention resides in the novel manner in which a resistance heating element is brought into close proximity with the passages through which the molding material is delivered.

These and other objects and features of my invention will be more easily understood and appreciated from the following description of preferred embodiments thereof selected for purposes of illustration and shown in the accompanying drawings in which:

Fig. 6 is a view partly in side elevation and partly in cross section of another embodiment of my invention.

Fig. 7 is a view in cross section on the line 7—7 of Fig. 6.

Fig. 8 is a diagrammatic view in side elevation of a third embodiment of my invention.

Fig. 9 is a view in cross section on the line 9—9 of Fig. 8, and

Fig. 10 is a view in cross section of another embodiment of my invention.

Figure 1:
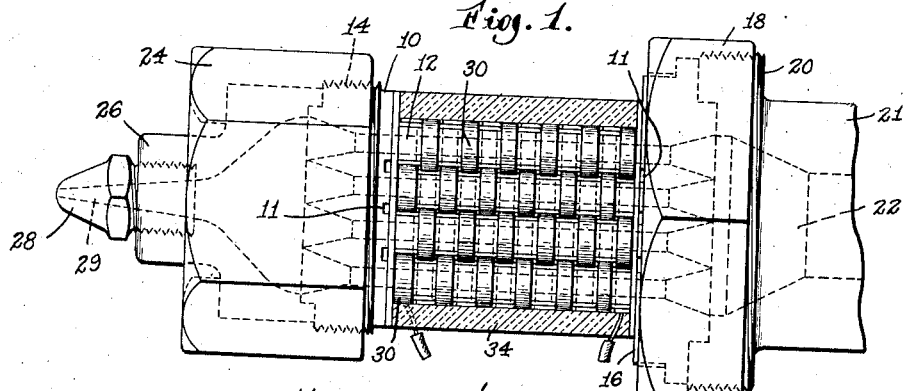
Fig. 1 is a view in side elevation of a conduit constructed according to my invention, with a fragment of the insulation removed.
Figure 2:
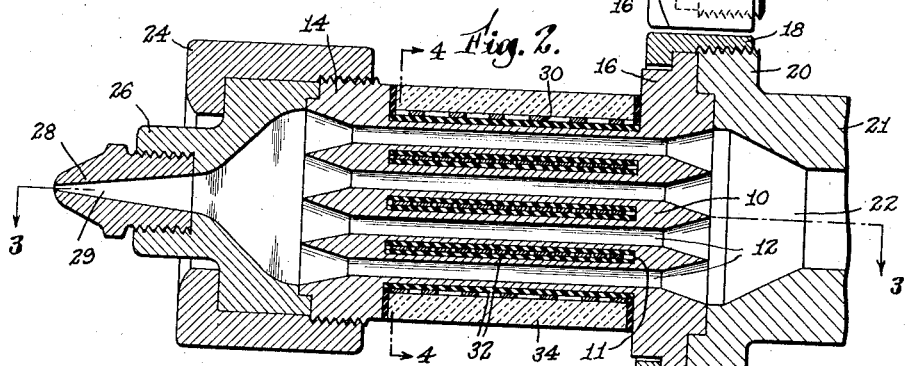
Fig. 2 is a corresponding view in cross section on the line 2—2 in Fig. 4.
Figure 3:
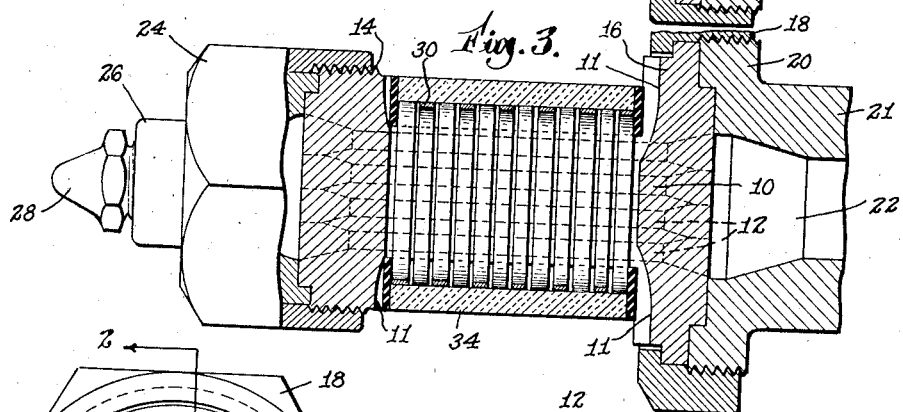
Fig. 3 is a view in cross section on the line 3—3 of Fig. 2.
Figure 4:
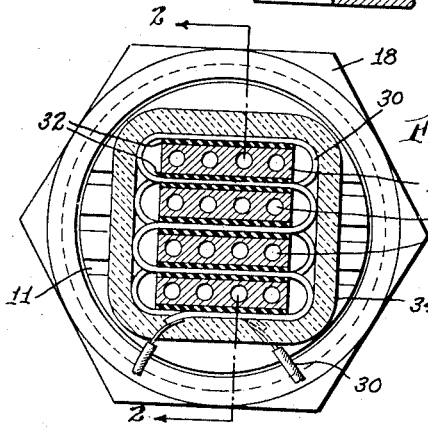
Fig. 4 is a view in cross section on the line 4—4 in Fig. 2.

Prefatory to a detailed description of the structure shown in the drawings, it should be understood that in practice the molding material is drawn from a hopper into a compression chamber (a portion of which is shown at the extreme right in Figs. 1-3). A ram or piston forces the material from the chamber through the conduit to the left of the chamber and out through the nozzle shown at the extreme left of Figs. 1-3. The essence of this invention consists in novel means for uniformly heating the conduit and the material being forced therethrough on its way to the mold.

The conduit consists of a rectangular metal body 10 provided with integral front and rear annular headers 14 and 16 respectively. Longitudinal slots are cut horizontally or transversely through the conduit body 10 by first sawing arcuate slots 11 therein, as shown in Fig. 3, and then machining out the slots to proper dimensions. Three such slots are formed and the result is a vertical stack of horizontally disposed integrally connected sections through which longitudinal or axial passages 12 are bored. The rear header 16 is provided with a polygonal coupling 18 having interior threads to engage the threaded surface of an annular flange 20 herein shown as formed integral with the cylindrical wall 21 of a compression chamber 22. By turning up the coupling 18 the conduit 10 is securely fastened to the outlet of the compression chamber 22. The ends of the passages 12 are flared to give them a streamlined effect and offer the least possible resistance to the passage of molding material. The front header 14 is threaded to engage interior threads on a polygonal coupling member 24 which serves to connect a nozzle housing 26 to the end of the header 14, and a nozzle 28 provided with a tapered passage 29 is threaded into the end of the nozzle housing 26.

Figure 5:
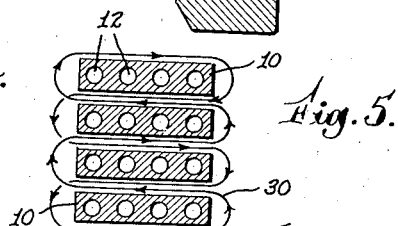
Fig. 5 is a diagrammatic view showing one manner of winding the resistance wire.

A flattened ribbon 30 of resistance wire is wound in and out through the slots 11 cut in the conduit 10. The manner in which the wire 30 is wound is clearly indicated by the arrows in Fig. 5. Thin sheets 32 of mica or other insulating material refractory under high temperature are placed along the surfaces of the slots in the conduit 10. An asbestos sheath 34 is clamped around the body portion of the conduit 10 in order to confine the heat within the conduit.

In operation electric current is caused to flow in the wire 30, and heat is thus generated as the result of the resistance of the wire 30 to the flow of electricity. The ram is then operated to force a charge of the material to be molded through the passages 12 into the conduit 10. The presence of the passages 12 breaks up and so distributes the mass of material being delivered that uniform heating is obtained and there is no portion of the material which does not reach the desired temperature. Regulation of the temperature of the material may be effected by providing a rheostat in the electric circuit.

In Figs. 6 and 7 I have shown an alternative form of apparatus further illustrating my invention. Three metallic tubes 40 are flattened, polished on the inside, and welded to front and rear headers 42 and 44. A polygonal coupling 46 on the rear header 44 is threaded to an annular flange 48 on the outlet end of a compression chamber 49, while the front header 42 is threaded to engage a polygonal coupling member 50 which embraces a shoulder provided on a nozzle housing 52. Threaded into the housing 52 is a conventional nozzle 54. A broad flat ribbon 56 of resistance wire is wound around the tubes 40, which are sheathed in insulation 58 of mica or other suitable insulating material, and side walls 59 of heat insulating material are placed along the sides of the tubes 40.

Tremendous pressures are created when the molding material is forced through the tubes 40, and it is necessary to provide upper and lower supporting plates 60 and 62 and these are insulated from the wire 56. Bolts 64 bind the plates 60 and 62 tightly against the ends of sleeves 66 which surround each of the bolts 64. The plates 60 and 62 thus bolted in place reinforce the whole structure and aid the tubes 40 in withstanding the pressures generated.

A third embodiment of my invention is illustrated diagrammatically in Figs. 8 and 9. A rectangular conduit body 70 has integral front and rear headers 72 and 74 respectively by which the conduit 70 is interposed between a compression chamber and a nozzle (not shown). Within the conduit body 70 are bored horizontal passages 82 through which molding material is delivered. Vertical holes 76 are drilled in the conduit body and receive separate resistance heating units 78 which are screwed into the holes 76 by the nuts 80. In this way each passage 82 is adjacent to two heating units 78, there being twenty-four heating units 78 and twelve passages 82.

A fourth embodiment of my invention is illustrated in Fig. 10 and includes a conduit 90 of rectangular shape through which are drilled rows of vertical holes. Into each of the holes is secured a porcelain tube 92. Resistance wire 94 is threaded through porcelain tubes 92 so that the interior of the conduit 90 may be uniformly heated when electricity is passed through the resistance wire 94. Sheets 93 of mica, or other insulating material which is also resistant to high temperature, are placed on the top and bottom of the conduit 90 so that the resistance wire 94 is fully insulated from the conduit. Horizontal passages 96 are drilled through the conduit 90 and serve to carry molding material being delivered through a nozzle.

In all the illustrated embodiments of my invention the passages for the delivery of molding material are closely associated with bodies resistant to electricity and included in a suitable electric circuit. It will also be seen that the surface area of a mass of material is effectively increased when it is forced through the plurality of passages in the body of the conduit. The combination of the steps of increasing the surface area of the mass of material and heating the mass by resistance heating generated in close proximity to the passages in the conduit is more efficient than any of the methods now practiced.

The foregoing description is merely illustrative of the manner in which the concept of my invention may be applied and does not attempt to define the scope of my invention. Variations in the structure illustrated will at once be apparent to those skilled in the art of injection molding and such minor variations are not to be considered as departing from the scope of the invention as defined in the appended claims.

Having now described and illustrated my invention, what I claim as new and desire to secure by Letters Patent of the United States of America is:

1. An apparatus for heating moldable materials, which comprises a plurality of flattened superposed horizontal tubes, headers welded to the ends of said tubes, a continuous band of resistance wire wound among and around said tubes, and upper and lower plates bolted together and confining said flattened tubes between them, whereby said tubes are maintained in shape against high pressure.

2. An apparatus for heating materials for molding, which comprises a conduit provided with axially disposed passages and transverse apertures, a flexible conductor having high resistance to electricity and wound in and out of said conduit through said apertures, and means for coupling said conduit between the compression chamber and the nozzle of a molding apparatus.

3. Apparatus for heating moldable materials, which comprises a plurality of superposed flattened tubes, headers secured at each end of said tubes and having outwardly flared passages in register with the ends of said tubes, clamping plates bolted together and confining between them the flattened tubes and preventing distortion thereof, and a continuous band wound about said tubes and providing a heating circuit.

4. Apparatus for heating moldable materials, which comprises a conduit having longitudinally disposed passages flared at least at one end of the conduit and a plurality of longitudinal through and through slots spaced within the ends of the conduit, and a continuous band of resistance wire wound transversely about said conduit in and out of said slots.

GRAYDON SMITH.